(12) United States Patent
Dowler et al.

(10) Patent No.: US 11,531,687 B2
(45) Date of Patent: Dec. 20, 2022

(54) METHOD AND APPARATUS FOR APPLICATION OF AN N-DIMENSIONAL HYPERCUBE DATATYPE

(71) Applicant: JPMorgan Chase Bank, N.A., New York, NY (US)

(72) Inventors: Nicholas Dowler, Bournemouth (GB); Andrew Key, Chandlers Ford (GB); Spyros Soukeras, London (GB); Daren Clarke, Brockenhurst (GB); Lee Farndell, Fareham (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 74 days.

(21) Appl. No.: 16/850,376

(22) Filed: Apr. 16, 2020

(65) Prior Publication Data
US 2021/0311963 A1    Oct. 7, 2021

(30) Foreign Application Priority Data

Apr. 2, 2020    (GR) .............................. 20200100167

(51) Int. Cl.
| | |
|---|---|
| G06F 16/28 | (2019.01) |
| G06F 16/21 | (2019.01) |
| G06F 16/2455 | (2019.01) |
| G06F 16/2457 | (2019.01) |

(52) U.S. Cl.
CPC .......... *G06F 16/283* (2019.01); *G06F 16/211* (2019.01); *G06F 16/24553* (2019.01); *G06F 16/24573* (2019.01)

(58) Field of Classification Search
CPC ............ G06F 16/283; G06F 16/24573; G06F 16/24553; G06F 16/211
See application file for complete search history.

(56) References Cited

U.S. PATENT DOCUMENTS

| | | | |
|---|---|---|---|
| 6,397,370 B1 * | 5/2002 | Fernandez | G06F 30/327 |
| | | | 716/103 |
| 10,331,660 B1 * | 6/2019 | Chapin | G06F 16/258 |
| 10,824,634 B2 * | 11/2020 | Siebel | G06F 8/77 |
| 2004/0015513 A1 * | 1/2004 | Petrulescu | G06F 16/283 |
| 2008/0301155 A1 * | 12/2008 | Borgsmidt | G06Q 40/06 |

(Continued)

*Primary Examiner* — Usmaan Saeed
*Assistant Examiner* — William P Bartlett
(74) *Attorney, Agent, or Firm* — Greenblum & Bernstein, P.L.C.

(57) ABSTRACT

Various methods, apparatuses/systems, and media for application of an N-dimensional hypercube datatype for automatically generating a data structure are provided. A database stores a plurality of data each associated with a corresponding application and each including metadata describing information about the data. A processor creates taxonomies describing data concepts associated with the metadata and store the taxonomies onto the database; receive the metadata and the taxonomies from the database via a communication network; automatically generate a cube set including a set of N-dimensional hypercubes from the received metadata to represent the metadata describing the information about the data; automatically generate a map from the cube set to express data quality checks and rules that apply to nodes in the map; and apply the data quality checks and rules to the received metadata to automatically generate a data structure.

17 Claims, 10 Drawing Sheets

(56) References Cited

U.S. PATENT DOCUMENTS

| | | | |
|---|---|---|---|
| 2009/0006409 A1* | 1/2009 | Yang | G06F 8/20 |
| 2011/0289071 A1* | 11/2011 | Gangadhar | G06F 16/00 |
| | | | 707/722 |
| 2014/0114907 A1* | 4/2014 | Kozina | G06F 16/219 |
| | | | 707/602 |
| 2015/0370872 A1* | 12/2015 | Raghavan | G06F 16/278 |
| | | | 726/5 |
| 2016/0366042 A1* | 12/2016 | Branson | G06F 16/24568 |
| 2018/0159884 A1* | 6/2018 | Meier | H04L 41/22 |
| 2018/0246912 A1* | 8/2018 | Arning | G06F 16/215 |
| 2019/0188308 A1* | 6/2019 | Simon | G06F 16/256 |

\* cited by examiner

800

| Rule | Node Name A | Node Type A | Node ID | Node Name B | Node Type B | Node ID | Node Name C | Node Type C | Node ID | Label | Value |
|---|---|---|---|---|---|---|---|---|---|---|---|
| Outflow Rule | Trade Confirmation System | Application System | 10001 | | | | | | | Out-{In+Created} | concept 'Settlement' where 'Currency' = 'GBP' concept 'Trade' |
| Individual Outflow Rule | Trade Confirmation System | Application System | 10001 | Trade Settlement System | Application System | 10003 | | | | Flow-{In+Created} | concept 'Settlement' where 'Currency' = 'GBP' |
| Individual Outflow Rule | Trade Confirmation System | Application System | 10001 | Trade Warehouse | Application System | 10002 | | | | Flow-{In+Created} | concept 'Trade' where 'Currency' = '-{EUR,GPB}' |
| Authority Rule | Trade Confirmation System | Application System | 10001 | | | | | | | Non-authoritative data | concept 'Settlement' where 'Currency' = '{EUR,GPB}' |
| Gap to Authority | Trade Settlement System | Application System | 10003 | Trade Confirmation System | Application System | 10001 | | | | Non-authoritative Inflow | concept 'Settlement' where 'Currency' = '{EUR,GPB}' |
| Gap to Authority Summary | Trade Settlement System | Application System | 10003 | | | | | | | Non-authoritative Inflow | 'Application System' '10001' 'Trade Confirmation System' |
| Gap to Authority | Trade Warehouse | Application System | 10002 | Trade Confirmation System | Application System | 10001 | | | | Non-authoritative Inflow | concept 'Trade' where 'Currency' = '-{EUR,GPB}' |
| Gap to Authority Summary | Trade Warehouse | Application System | 10002 | | | | | | | Non-authoritative Inflow | 'Application System' '10001' 'Trade Confirmation System' |

| Name | Type | ID | Input Flows | Input | Calculated Inventory | Declared Inventory | Calculated Minus Declared Inventory | Calculated Intersect Declared Inventory | Declared Minus Calculated Inventory | Calculated ADS | Declared ADS | Calculated Minus Declared ADS | Calculated Intersect Declared ADS | Declared Minus Calculated ADS | Calculated SOR |
|---|---|---|---|---|---|---|---|---|---|---|---|---|---|---|---|
| Trade Capture System | Application System | 10000 | | | | | | | | | | | | | concept 'Trade' where |
| Trade Confirmation System | Application System | 10001 | provider 'Application System' | concept 'Trade' where | | | | | | concept 'Trade' where | concept 'Trade' where | | concept 'Trade' where | | concept 'Settlement' where |
| Trade Settlement System | Application System | 10003 | provider 'Application System' | concept 'Settlement' where | concept 'Settlement' where | | concept 'Settlement' where | | | | | | | | |
| Trade Warehouse | Application System | 10002 | provider 'Application System' | concept 'Trade' where | concept 'Trade' where | | concept 'Trade' where | | | | | | | | |

| Name | Type | ID | Input Flows | Input | Calculated SOR | Declared SOR | Calculated Minus Declared SOR | Calculated Intersect Declared | Declared Minus Calculated SOR | Output | Output Flows | Overlap of inventory and ADS | Overlap of ADS and SOR | Overlap of SOR and inventory | Declared Created | Declared Created Minus SOR | Declared SOR Minus Created |
|---|---|---|---|---|---|---|---|---|---|---|---|---|---|---|---|---|---|
| Trade Capture System | Application System | 10000 | | | concept 'Trade' where | concept 'Trade' where | | concept 'Trade' where | | concept 'Trade' where | provider 'Application System' | | | | concept 'Trade' where | | |
| Trade Confirmation System | Application System | 10001 | provider 'Application System' | concept 'Settlement' where | concept 'Settlement' where | | concept 'Settlement' where | | | concept 'Settlement' where | provider 'Application System' | | | | concept 'Settlement' where | concept 'Settlement' where | |
| Trade Settlement System | Application System | 10003 | provider 'Application System' | concept 'Settlement' where | | | | | | | | | | | | | |
| Trade Warehouse | Application System | 10002 | provider 'Application System' | concept 'Trade' where | | | | | | | | | | | | | |

FIG. 9B

METHOD AND APPARATUS FOR APPLICATION OF AN N-DIMENSIONAL HYPERCUBE DATATYPE

CROSS-REFERENCE TO RELATED APPLICATIONS

This application claims the benefit of priority from Greek Patent Application No. 20200100167, filed Apr. 2, 2020, which is herein incorporated by reference in its entirety.

TECHNICAL FIELD

This disclosure generally relates to data processing, and, more particularly, to methods and apparatuses for applying an N-dimensional hypercube datatype for automatically generating a data structure and applying the data structure to model data in various locations (nodes) and data flowing between those locations.

BACKGROUND

Today's enterprises, corporations, agencies, institutions, and other organizations are facing a continuing problem of handling and processing a vast amount of data having differing formats (e.g., XML, JSON, Mainframe, etc.) in a quick and expedited manner. The vast amount of data often received on a daily basis may be now stored electronically and may need to be analyzed by a variety of persons within the organization relative to business or organizational goals, e.g., in building new applications or editing or decommissioning old applications. Each day, a data loader may load millions of data (e.g., entity data) having multiple formats which may require coding (and recoding when any changes occur to the data) for processing and analysis. The need to determine efficiently what data may be available for analysis and how to analyze disparate data across organizational management boundaries may prove to be extremely time consuming and confusing as the data being tracked increases and as organizations implement more specialized or distributed functions.

Many enterprises, especially banks, may be under increasing regulatory scrutiny, and this may include being able to substantiate data found on regulatory reports. It may be necessary to be able to trace data lineage from report content, back through applications acting as Authoritative Data Sources (ADS), back to the System of Record (SOR). For example, when building new applications, it may be necessary to be able to identify appropriate authoritative sources of data. When making change, or decommissioning old applications, it may be necessary to be able to identify all upstream and downstream impacts this would cause. All of the above may require that there may be metadata recorded or captured that describes the data present in nodes/applications, and flowing between them. It may also require that the metadata may be appropriately expressive and detailed, so that it doesn't just describe the "type" of the data, it also describes the "subset" of that type which might be involved in a particular deployment of the application, in a particular location, subject to particular constraints, etc. In addition, it may be critical that this metadata is represented in a form which allows mathematical operations to be performed upon it.

The harvesting of metadata describing data present and flowing may likely to include a mixture of automatic and manual capture, which may prove to be highly error prone.

SUMMARY

The present disclosure, through one or more of its various aspects, embodiments, and/or specific features or sub-components, may provide, among others, various systems, servers, devices, methods, media, programs, and platforms for applying an N-dimensional hypercube datatype and code module for automatically generating a data structure and applying the data structure to model data in various locations (nodes) and data flowing between those locations to support calculation and reasoning about data present in locations (nodes) and data flowing between them, including checking data quality and automatically generating lineage diagrams, thereby gaining a high degree of confidence in the metadata recorded, but the disclosure is not limited thereto. In addition, the present disclosure, through one or more of its various aspects, embodiments, and/or specific features or sub-components, may further provide, among others, various systems, servers, devices, methods, media, programs, and platforms for applying an N-dimensional hypercube datatype and code module for automatically generating data lineage accurately, thereby automatically detecting that data leaving an application is not more than data entering an application plus any data created by the application, but the disclosure is not limited thereto. According to the context of the exemplary embodiments of the instant disclosure, automatically detecting and resolving data quality issues significantly reduces size of data for analysis, but the disclosure is not limited thereto.

According to an aspect of the present disclosure, a method for applying an N-dimensional hypercube datatype application module for automatically generating a data structure by utilizing one or more processors and one or more memories is disclosed. The method may include: providing a database that stores a plurality of data each associated with a corresponding application and each including metadata describing information about data present in an application, information about data that an application is authoritative, and information about data that flows between applications; creating taxonomies describing data concepts associated with the metadata and storing the taxonomies onto the database; receiving the metadata and the taxonomies from the database via a communication network; automatically generating a cube set including a set of N-dimensional hypercubes from the received metadata to represent the metadata describing the information about the data present in the application, the information about the data that the application is authoritative, and the information about the data that flows between applications; automatically generating a map from the cube set to express data quality checks and rules that apply to nodes in the map; and applying the data quality checks and rules to the received metadata to automatically generate a data structure.

According to another aspect of the present disclosure, the method may further include: automatically generating a cube set by automatically creating the data structure from the received metadata to represent the set of N-dimensional hypercubes.

According to yet another aspect of the present disclosure, the method may further include: applying intersection, union, and difference operations between cube sets to generate a single cube set.

According to further aspect of the present disclosure, wherein values acceptable in each dimension of the N-dimensional hypercubes are expressed as a set of included or excluded terms from a taxonomy among the created taxonomies describing the data concepts.

According to yet another aspect of the present disclosure, wherein each set of N-dimensional hypercubes is expressed as sum-of-products form so that a data point to be included in an N-dimensional hypercube, the data point satisfies constraint on each dimension of the N-dimensional hypercube in successions.

According to an additional aspect of the present disclosure, wherein each set of N-dimensional hypercubes is expressed as sum-of-products form so that a data point to be included in the set of N-dimensional hypercubes, the data point satisfies a constraint that the data point is included in at least one of the hypercube among the set of N-dimensional hypercubes.

According to yet another aspect of the present disclosure, the method may further include: describing any subset of an N-dimensional space by a predefined number of set of N-dimensional hypercubes selected from the set of N-dimensional hypercubes, but the disclosure is not limited thereto. For example, according to a further aspect of the present disclosure, the method may further include segmenting any cube into smaller cubes, and applying a subset of those smaller cubes.

According to another aspect of the present disclosure, a system for applying an N-dimensional hypercube datatype for automatically generating a data structure is disclosed. The system may include a database that stores a plurality of data each associated with a corresponding application and each including metadata describing information about data present in an application, information about data that an application is authoritative, and information about data that flows between applications, and a processor that is coupled to the database via a communication network. The processor may be configured to: create taxonomies describing data concepts associated with the metadata and store the taxonomies onto the database; receive the metadata and the taxonomies from the database via a communication network; automatically generate a cube set including a set of N-dimensional hypercubes from the received metadata to represent the metadata describing the information about the data present in the application, the information about the data that the application is authoritative, and the information about the data that flows between applications; automatically generate a map from the cube set to express data quality checks and rules that apply to nodes in the map; and apply the data quality checks and rules to the received metadata to automatically generate a data structure.

According to yet another aspect of the present disclosure, the processor may be further configured to automatically generate a cube set by creating the data structure from the received metadata to represent the set of N-dimensional hypercubes.

According to another aspect of the present disclosure, the processor may be further configured to apply intersection, union, and difference operations between cube sets to generate a single cube set.

According to a further aspect of the present disclosure, the processor may be further configured to describe any subset of an N-dimensional space by a predefined number of set of N-dimensional hypercubes selected from the set of N-dimensional hypercubes, but the disclosure is not limited thereto. For example, according to a further aspect of the present disclosure, the processor may be further configured to segment any cube into smaller cubes, and apply a subset of those smaller cubes.

According to another aspect of the present disclosure, a non-transitory computer readable medium configured to store instructions for applying an N-dimensional hypercube datatype for automatically generating a data structure is disclosed. The instructions, when executed, may cause a processor to perform the following: accessing a database that stores a plurality of data each associated with a corresponding application and each including metadata describing information about data present in an application, information about data that an application is authoritative, and information about data that flows between applications; creating taxonomies describing data concepts associated with the metadata and storing the taxonomies onto the database; receiving the metadata and the taxonomies from the database via a communication network; automatically generating a cube set including a set of N-dimensional hypercubes from the received metadata to represent the metadata describing the information about the data present in the application, the information about the data that the application is authoritative, and the information about the data that flows between applications; automatically generating a map from the cube set to express data quality checks and rules that apply to nodes in the map; and applying the data quality checks and rules to the received metadata to automatically generate a data structure.

According to yet another aspect of the present disclosure, the instructions, when executed, may further cause the processor to automatically generate a cube set by creating the data structure from the received metadata to represent the set of N-dimensional hypercubes.

According to another aspect of the present disclosure, the instructions, when executed, may further cause the processor to apply intersection, union, and difference operations between cube sets to generate a single cube set.

According to a further aspect of the present disclosure, the instructions, when executed, may further cause the processor to describe any subset of an N-dimensional space by a predefined number of set of N-dimensional hypercubes selected from the set of N-dimensional hypercubes, but the disclosure is not limited thereto.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates an exemplary system output in accordance with an exemplary embodiment.

FIG. 9A illustrates another exemplary system output in accordance with an exemplary embodiment.

FIG. 9B illustrates another exemplary system output in accordance with an exemplary embodiment.

DETAILED DESCRIPTION

Figure 1:
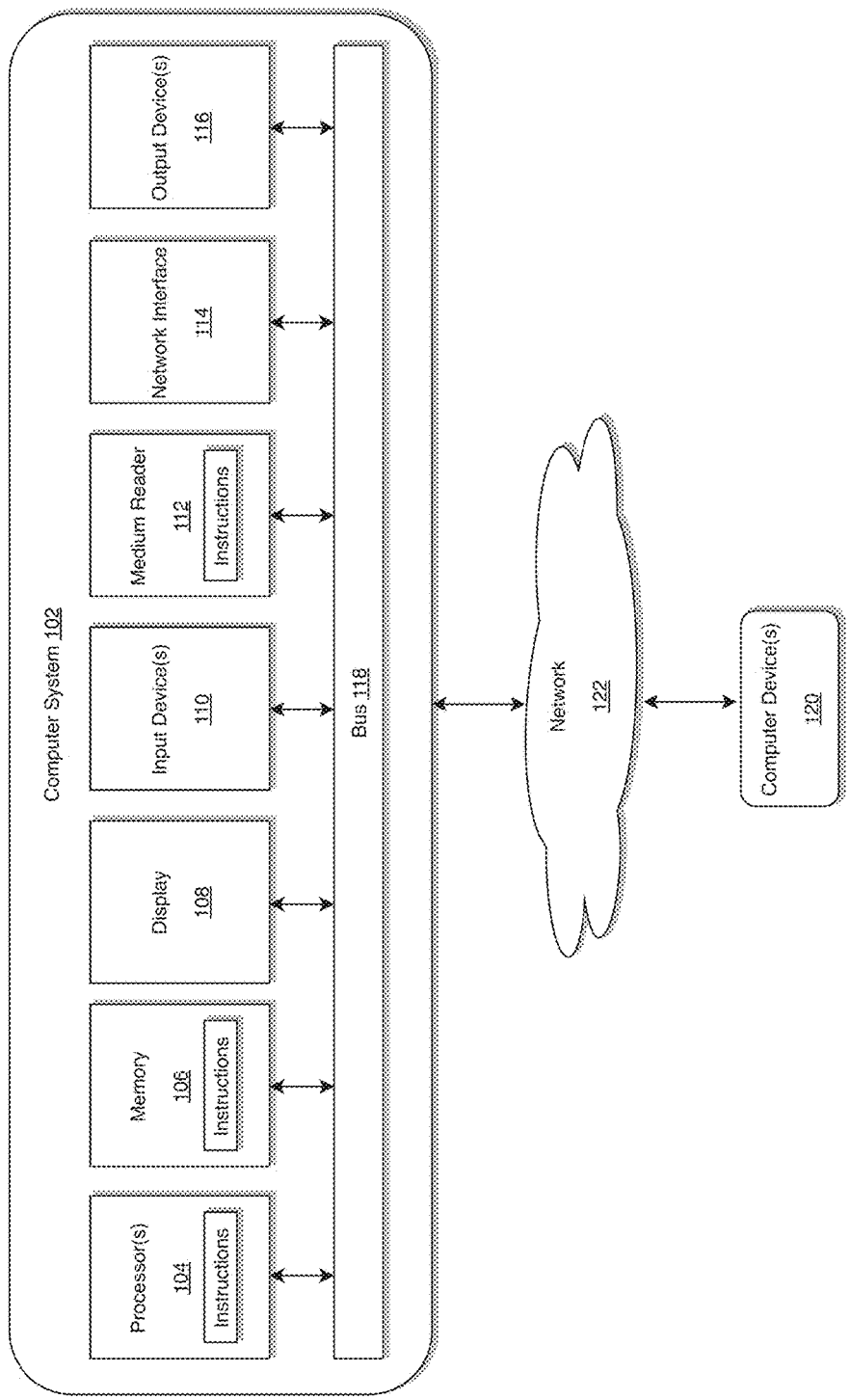
FIG. 1 illustrates a computer system for implementing an N-dimensional hypercube datatype application device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of application of an N-dimensional hypercube datatype and code module for automatically generating a data structure and applying the data structure to model data in various locations (nodes) and data flowing between those locations to support calculation and reasoning about data present in locations (nodes) and data flowing between them, including checking data quality and automatically generating lineage diagrams, thereby gaining a high degree of confidence in the metadata recorded, but the disclosure is not limited thereto. As described herein, various embodiments may further provide optimized processes of applying an N-dimensional hypercube datatype and code module for automatically generating data lineage accurately, thereby automatically detecting that data leaving an application is not more than data entering an application plus any data created by the application, but the disclosure is not limited thereto.

Figure 2:
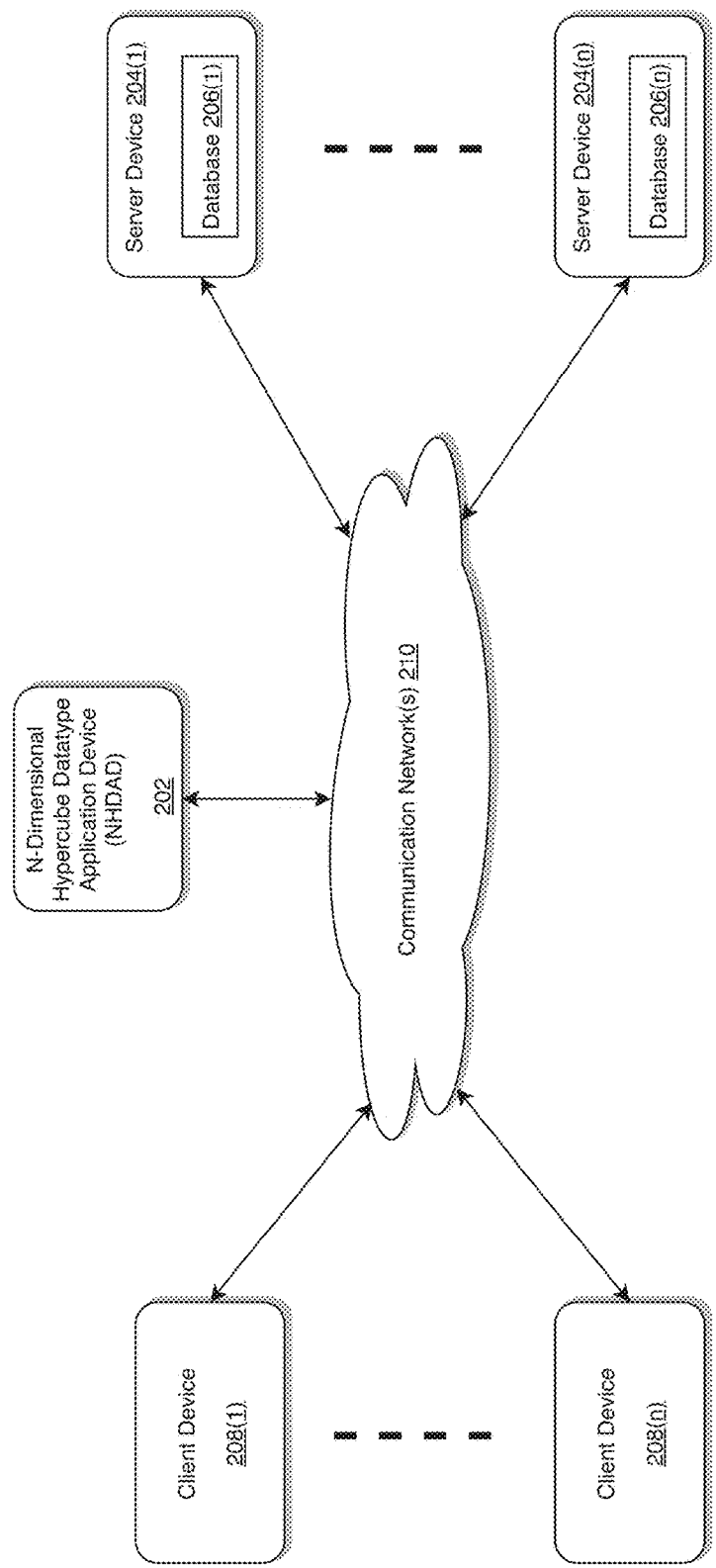
FIG. 2 illustrates an exemplary diagram of a network environment with an N-dimensional hypercube datatype application device in accordance with an exemplary embodiment.

Referring to FIG. 2, a schematic of an exemplary network environment 200 for implementing an N-dimensional hypercube datatype application device (NHDAD) of the instant disclosure is illustrated.

Conventional system, that does not implement an NHDAD of the instant disclosure, may not be able to handle and process a vast amount of data in a quick and expedited manner. For example, conventional data processing system that does not implement an NHDAD of the instant disclosure may neither identify appropriate authoritative sources of data when building new applications, nor identify all upstream and downstream impacts this would cause when making change, or decommissioning old applications. In addition, conventional data processing system that does not implement an NHDAD of the instant disclosure, may not be configured to detect and resolve data quality issues with a high degree of confidence the metadata recorded is accurate.

According to exemplary embodiments, the above-described problems associated with conventional system may be overcome by implementing an NHDAD 202 having an N-dimensional hypercube datatype application module as illustrated in FIG. 2 automatically generating data lineage accurately, thereby automatically detecting and resolving data quality issues, and thus gaining a high degree of confidence in the metadata recorded, but the disclosure is not limited thereto.

The NHDAD 202 may be the same or similar to the computer system 102 as described with respect to FIG. 1.

The NHDAD 202 may store one or more applications that can include executable instructions that, when executed by the NHDAD 202, cause the NHDAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the NHDAD 202 itself, may be located in virtual server(s) running in a cloud-based computing environment rather than being tied to one or more specific physical network computing devices. Also, the application(s) may be running in one or more virtual machines (VMs) executing on the NHDAD 202. Additionally, in one or more embodiments of this technology, virtual machine(s) running on the NHDAD 202 may be managed or supervised by a hypervisor.

In the network environment 200 of FIG. 2, the NHDAD 202 is coupled to a plurality of server devices 204(1)-204(n) that hosts a plurality of databases 206(1)-206(n), and also to a plurality of client devices 208(1)-208(n) via communication network(s) 210. A communication interface of the NHDAD 202, such as the network interface 114 of the computer system 102 of FIG. 1, operatively couples and communicates between the NHDAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the NHDAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

The NHDAD 202 may be a standalone device or integrated with one or more other devices or apparatuses, such as one or more of the server devices 204(1)-204(n), for example. In one particular example, the NHDAD 202 may be hosted by one of the server devices 204(1)-204(n), and other arrangements are also possible. Moreover, one or more of the devices of the NHDAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the NHDAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the NHDAD 202 that may be configured for automatically generating N-dimensional hypercube datatype and applying the N-dimensional hypercube datatype for calculating and testing of data location and flow statements, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the NHDAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the NHDAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the NHDAD 202, the server devices 204(1)-204(n), or the client devices 208(1)-208(n), for example, may be configured to operate as virtual instances on the same physical machine. For example, one or more of the NHDAD 202, the server devices 204(1)-204(n), or the client devices 208(1)-208(n) may operate on the same physical device rather than as separate devices communicating through communication network(s) 210. Additionally, there may be more or fewer NHDADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
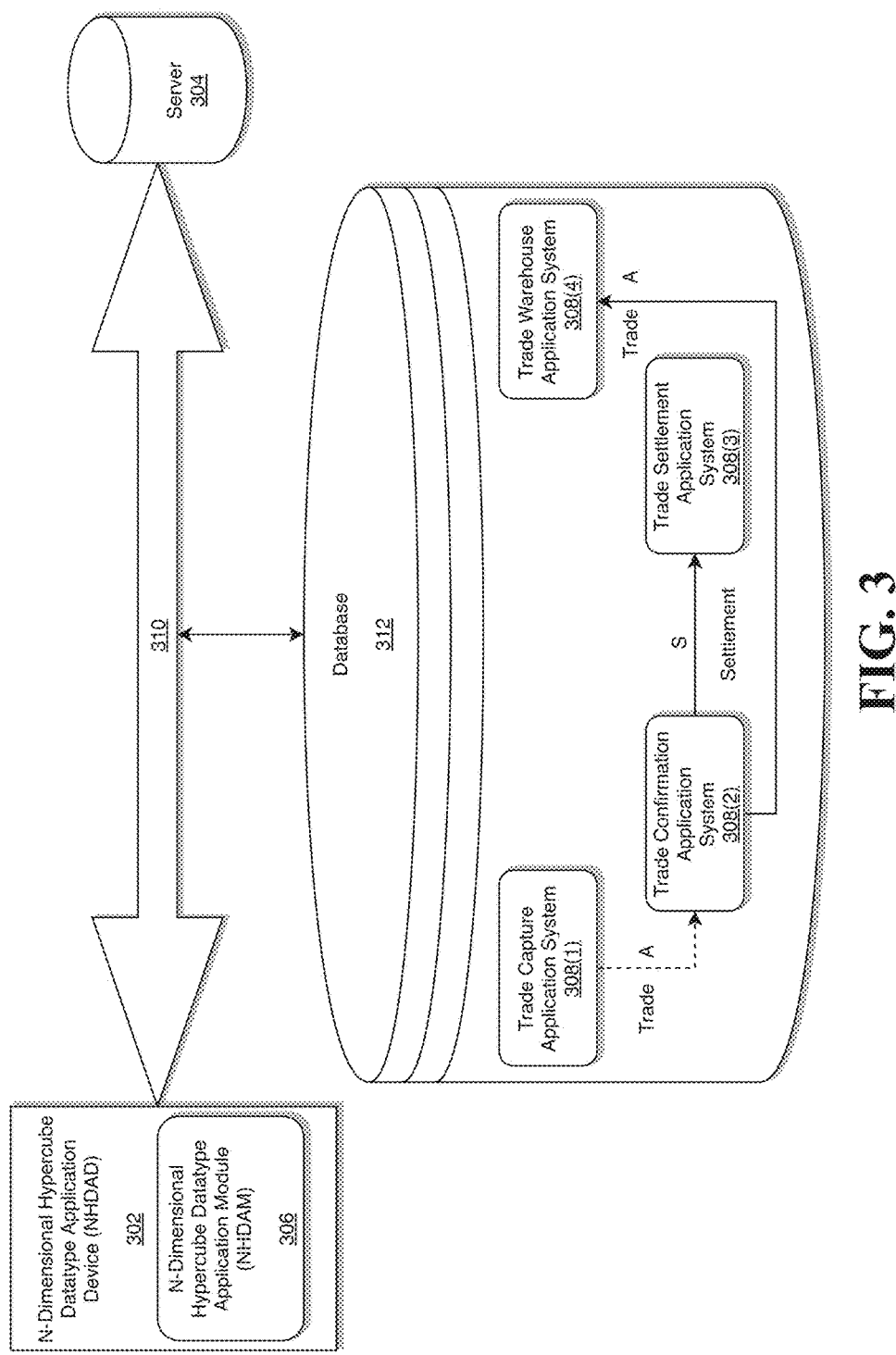
FIG. 3 illustrates a system diagram for implementing an N-dimensional hypercube datatype application device with an N-dimensional hypercube datatype application module in accordance with an exemplary embodiment.

FIG. 3 illustrates a system diagram for implementing an NHDAD with an N-dimensional hypercube datatype application module (NHDAM) in accordance with an exemplary embodiment.

As illustrated in FIG. 3, in the system 300, according to exemplary embodiments, the NHDAD 302 including the NHDAM 306 may be connected to a server 304 and a database 312 via a communication network 310, but the disclosure is not limited thereto. For example, according to exemplary embodiments, the NHDAM 306 may be connected to any desired database besides database 312. According to exemplary embodiments, the database 312 may be configured to store outputs (e.g., data) from each of a trade capture application system 308(1), a trade confirmation application system 308(2), a trade settlement application system 308(3) and a trade warehouse application system 308(4), but the disclosure is not limited thereto.

According to exemplary embodiments, the system 300 may be configured to identify and record the fact that a node is supposed to be behaving as an SOR or an ADS.

For example, if a node creates data, it may be referred to as the SOR for that data. Thus, if a node does not receive data, but sends the data that it creates to another node for further processing, it is acting as an SOR for that data. The system 300, according to exemplary embodiments, may be configured to record the fact that the node is supposed to be behaving as an SOR for that particular kind of data.

On the other hand, if a node receives data and sends the data to another node for further processing, it is acting as an ADS for that data. The system 300, according to exemplary embodiments, may be configured to record the fact that the node is supposed to be behaving as an ADS for that particular kind of data.

According to exemplary embodiments, the system 300 may also be configured to check that a node is supposed to be acting as an SOR or an ADS for the same set of data.

In the exemplary embodiment as illustrated in FIG. 3, the trade capture application system 308(1) creates trade data A and sends the trade data A to the trade confirmation application system 308(2). Thus, in this example, the system 300 may be configured to identify and record the fact that the trade capture application system 308(1) is the SOR for trade data A and the trade confirmation application system 308(2) is the ADS for the trade data A, because the trade confirmation application system 308(2) forwards the trade data A received from the trade capture application system 308(1) to the trade warehouse application system 308(4).

In addition, according to exemplary embodiments as illustrated in FIG. 3, the trade confirmation application system 308(2) creates settlement data S and sends the settlement data S to the trade settlement application system 308(3). Thus, in this example, the system 300 may be configured to identify and record the fact that the trade confirmation application system 308(2) is the SOR for settlement data S. Exemplary outputs are illustrated with reference to FIGS. 8, 9A, and 9B.

According to exemplary embodiment, the NHDAD 302 is described and shown in FIG. 3 as including the NHDAM 306, although it may include other rules, policies, modules, databases, or applications, for example. According to exemplary embodiments, the database 312 may be configured to store a plurality of data each associated with a corresponding application and each including metadata describing information about data present in an application, information about data that an application is authoritative, and information about data that flows between applications. According to exemplary embodiments, the database 312 may be embedded within the NHDAD 302. According to exemplary embodiments, the server 304 may also be a database which may be configured to store information including the metadata, but the disclosure is not limited thereto. According to exemplary embodiments, the NHDAM 306 may also be referred to as N-dimensional hypercube datatype and code module.

According to exemplary embodiments, the NHDAM 306 may be configured to receive continuous feed of data from the server 304 and the database 312 via the communication network 310.

As will be described below, the NHDAM 306 may be configured to create taxonomies describing data concepts associated with the metadata and store the taxonomies onto the database; receive the metadata and the taxonomies from the database via a communication network; automatically generate a cube set including a set of N-dimensional hypercubes from the received metadata to represent the metadata describing the information about the data present in the application, the information about the data that the application is authoritative, and the information about the data that flows between applications; automatically generate a map from the cube set to express data quality checks and rules that apply to nodes in the map; and apply the data quality checks and rules to the received metadata to automatically generate data lineage of each of said plurality of data.

According to exemplary embodiments, the server 304 may be the same or equivalent to the server device 204 as illustrated in FIG. 2.

The process may be executed via the communication network 310, which may comprise plural networks as described above. For example, in an exemplary embodiment, either or all of the trade capture application system 308(1), the trade confirmation application system 308(2), the trade settlement application system 308(3) and the trade warehouse application system 308(4) may communicate with the NHDAD 302 via broadband or cellular communication. Of course, these embodiments are merely exemplary and are not limiting or exhaustive.

Figure 4:
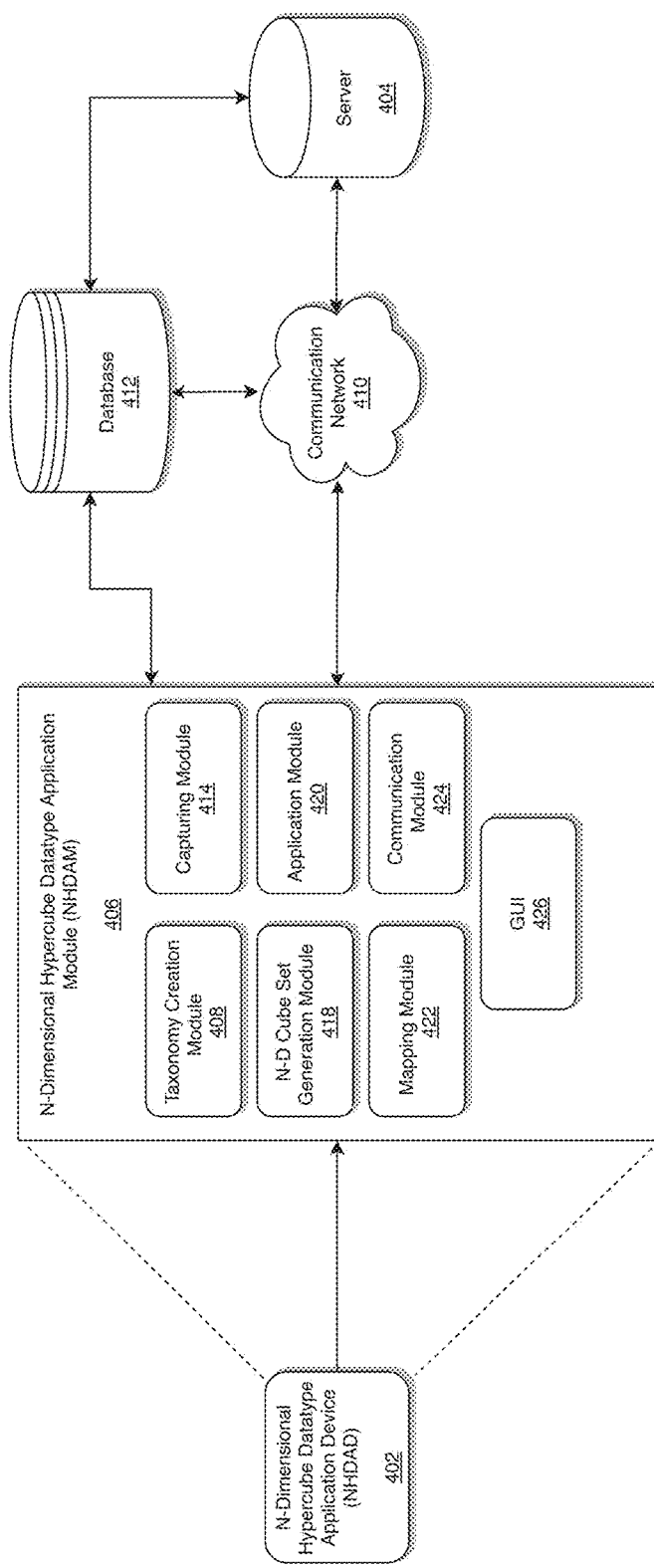
FIG. 4 illustrates a system diagram for implementing an N-dimensional hypercube datatype application module of FIG. 3 in accordance with an exemplary embodiment.

FIG. 4 illustrates a system diagram for implementing an N-dimensional hypercube datatype application module of FIG. 3 in accordance with an exemplary embodiment. As illustrated in FIG. 4, the system 400 may include an NHDAD 402 within which an NHDAM 406 may be embedded, a database 412, a server 404, and a communication network 410.

As illustrated in FIG. 4, the NHDAM 406 may include a taxonomy creation module 408, a capturing module 414, an N-dimensional cube set generation module 418, an application module 420, a mapping module 422, a communication module 424, and a GUI 426. According to exemplary embodiments, the database 412 may be external to the NHDAD 402 and the NHDAD 402 may include various systems that are managed and operated by an organization.

The process may be executed via the communication network 410, which may comprise plural networks as described above. For example, in an exemplary embodiment, the various components of the NHDAM 406 may communicate with the server 404, and the database 412 via the communication module 424 and the communication network 410. Of course, these embodiments are merely exemplary and are not limiting or exhaustive.

According to exemplary embodiments, the communication module 424 may be configured to establish a link between the database 412 via the communication network 410.

According to exemplary embodiments, each of the taxonomy creation module 408, the capturing module 414, the N-dimensional cube set generation module 418, the application module 420, the mapping module 422, and the communication module 424 may be implemented by microprocessors or similar, they may be programmed using software (e.g., microcode) to perform various functions discussed herein. Alternatively, each of the taxonomy creation module 408, the capturing module 414, the N-dimensional cube set generation module 418, the application module 420, the mapping module 422, and the communication module 424 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the taxonomy creation module 408, the capturing module 414, the N-dimensional cube set generation module 418, the application module 420, the mapping module 422, and the communication module 424 may be physically separated into two or more interacting and discrete blocks, units, devices, and/or modules without departing from the scope of the inventive concepts.

According to exemplary embodiments, the taxonomy creation module 408 may be configured to create taxonomies describing data concepts associated with the metadata and store the taxonomies onto the database 412. The capturing module 414 may be configured to capture and receive the metadata and the taxonomies from the database 412 via the communication network 410 and the communication module 424.

According to exemplary embodiments, the N-dimensional cube set generation module 418 may be configured to automatically generate a cube set including a set of N-dimensional hypercubes from the received metadata received from the database 412 to represent the metadata describing the information about the data present in the application, the information about the data that the application is authoritative, and the information about the data that flows between applications.

According to exemplary embodiments, the mapping module 422 may be configured to generate a map from the cube set to express data quality checks and rules that apply to nodes in the map. An exemplary nodes distribution and map 800 has been illustrated in FIG. 8.

According to exemplary embodiments, the application module 420 may be configured to apply the data quality checks and rules to the received metadata to automatically generate data lineage map of each of the plurality of data. Exemplary data lineage maps 900A, 900B, have been illustrated with reference to FIGS. 9A and 9B, respectively. The set of N-dimensional hypercubes and the lineage map may be displayed on the GUI 426.

With reference to FIGS. 3-9B, below is an exemplary summary of a lineage map corresponding to trade confirmation application system 308(2).

```
Starting Node
ADS
concept 'Trade'
where 'Currency' = '{EUR,GBP}'
     and 'Location' = 'Europe/UK'
(in this example, referring to FIG. 3, the trade confirmation application system 308(2)
is behaving as an ADS for trade information, but only where the currency is EUR or
GBP and the location is UK)
SOR
concept 'Settlement'
where 'Currency' = '{EUR,GBP}'
concept 'Trade'
where 'Currency' = '-{EUR,GBP}' (this syntax means that currency may be any
currency other than EUR or GBP)
     and 'Location' = 'Europe/UK'
Node - Trade Capture Application System 308(1)
To Starting Node ADS (referring to FIG. 3, this is what data from the trade capture
application system 308(1) shows to the ADS portion of the trade confirmation
application system 308(2))
concept 'Trade'
where 'Currency' = '{EUR,GBP}'
     and 'Location' = 'Europe/UK'
Node - Trade Warehouse Application System 308(4)
From Starting Node ADS
concept 'Trade'
where 'Currency' = '{EUR,GBP}'
     and 'Location' = 'Europe/UK'
From Starting Node SOR
concept 'Trade'
where 'Currency' = '-{EUR,GBP}'
     and 'Location' = 'Europe/UK'
Node - Trade Settlement Application System 308(3)
From Starting Node SOR
concept 'Settlement'
where 'Currency' = '{EUR,GBP}'
Flow from Trade Capture Application System 308(1) to Trade Confirmation
Application System 308(2)
To Starting Node ADS
concept 'Trade'
where 'Currency' = '{EUR,GBP}'
     and 'Location' = 'Europe/UK'
Flow from Trade Confirmation Application System 308(2) to Trade Warehouse
Application system 308(4)
From Starling Node ADS
concept 'Trade'
where 'Currency' = '{EUR,GBP}'
     and 'Location' = 'Europe/UK'
Flow from Trade Confirmation Application System 308(2) to Trade Settlement
Application System 308(3)
From Starting Node SOR
concept 'Settlement'
where 'Currency' = '{EUR,GBP}'
Flow from Trade Confirmation Application System 308(2) to Trade Warehouse
Application System 308(4)
From Starting Node SOR
concept 'Trade'
where 'Currency' = '-{EUR,GBP}'
     and 'Location' = 'Europe/UK'
```

According to exemplary embodiments, the N-dimensional cube set generation module 418 may be further configured to automatically generate a cube set by creating a data-structure from the received metadata to represent the set of N-dimensional hypercubes.

Figure 5:
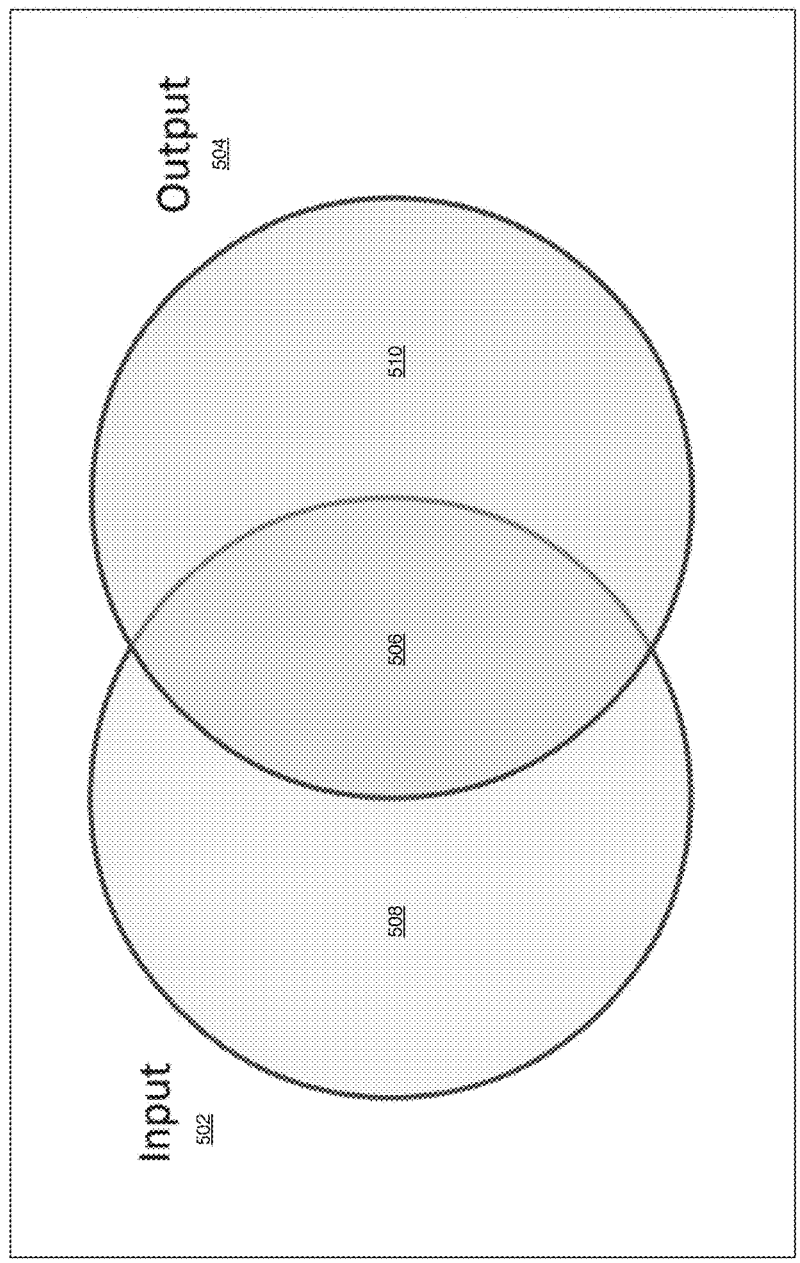
FIG. 5 illustrates an exemplary process flow in generating an N-dimensional hypercube in accordance with an exemplary embodiment.
Figure 6:
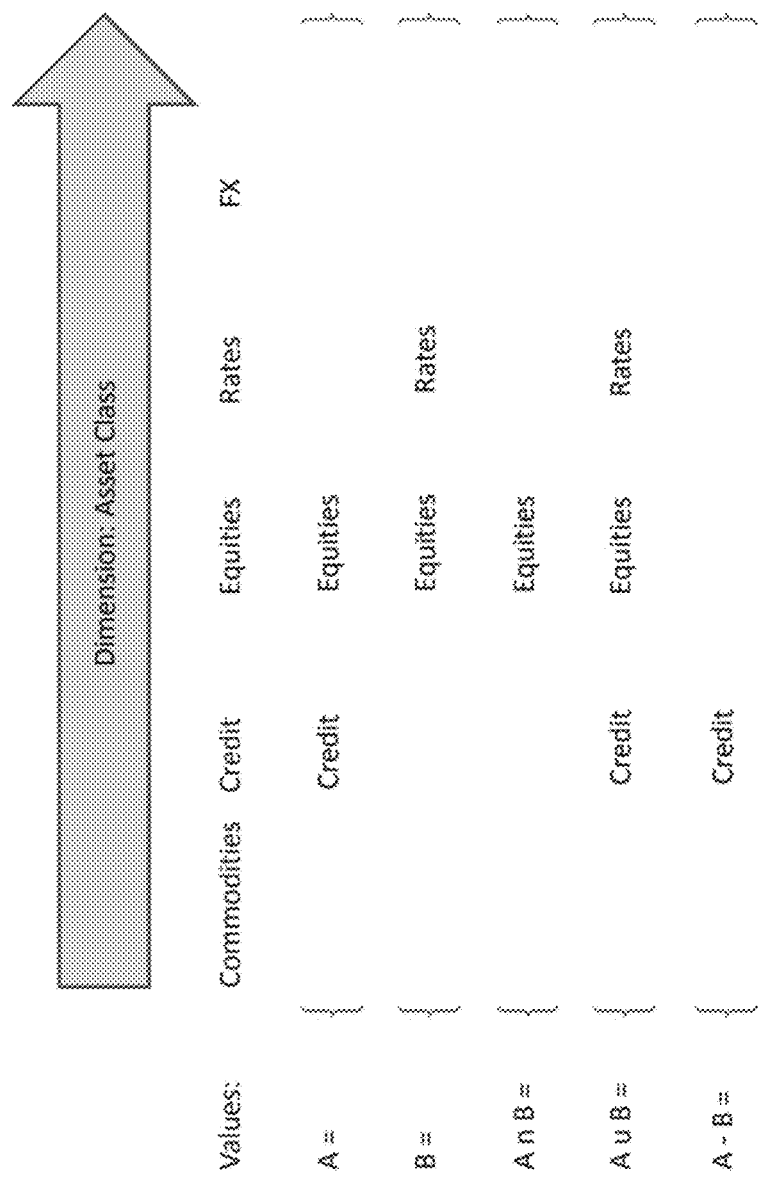
FIG. 6 illustrates an exemplary logic chart in generating an N-dimensional hypercube in accordance with an exemplary embodiment.
Figure 7:
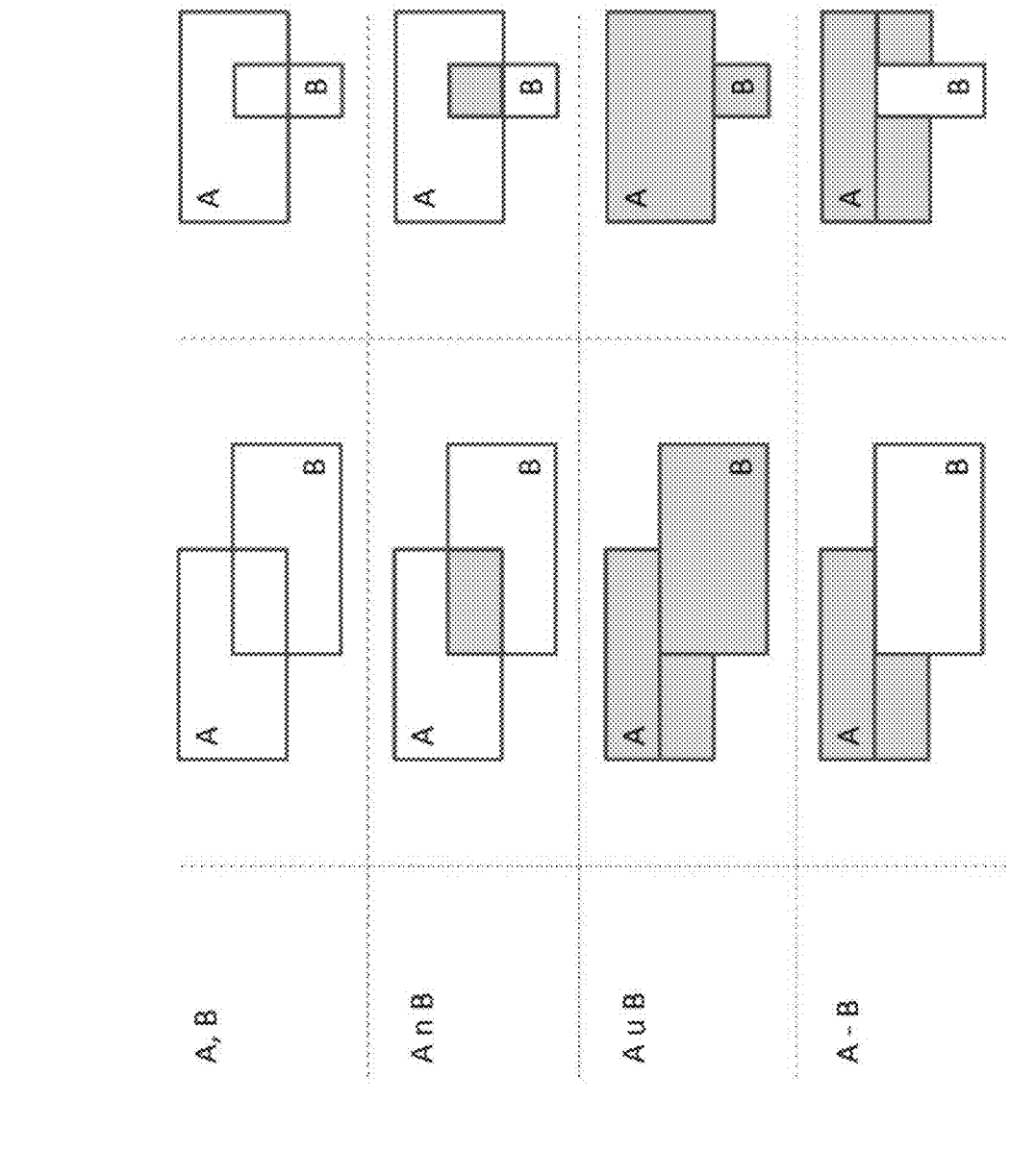
FIG. 7 illustrates an exemplary algorithm in two dimensions in accordance with an exemplary embodiment.

According to exemplary embodiments, with reference to FIGS. 5-7, the application module 420 may be configured to apply intersection, union, and difference operations between cube sets to generate a single cube set.

For example, FIGS. 5-7 illustrates processes for application of boundary sets for data management in accordance with an exemplary embodiment. More specifically, FIG. 5 illustrates an exemplary process flow in generating an N-dimensional hypercube in accordance with an exemplary embodiment. The diagram as illustrated in FIG. 5, represents some exemplary algorithm for calculating inventory, ADS, and SOR given input and outputs. FIG. 6 illustrates an exemplary logic chart in generating an N-dimensional hypercube in accordance with an exemplary embodiment. The logic chart as illustrated in FIG. 6, exemplifies the logical operations that may be performed on a single "asset class" dimension. FIG. 7 illustrates an exemplary algorithm in two dimensions in accordance with an exemplary embodiment.

The Information Architecture (e.g., Corporate and Investment Banking (CIB) Information Architecture) and Data Management (e.g., Chief Data Office) functions may have a requirement across an enterprise to be able to describe bodies of data, such as the data: created or passed on by an application—the System of Record (SOR) and Authoritative Data Source (ADS); stored within an application—Inventories; sent from one application to another—as a Data Flow; subject to some regulatory constraint, e.g., personally identifiable information (PII) data, etc. These descriptions may be referred to as "Boundary Sets".

According to exemplary embodiments, the NHDAM 406 may be configured to perform set operations on boundary sets in order to generate new boundary sets describing one or more of the following: information consumed but not stored or forwarded (consumed-stored-forwarded); information that flows that requires encryption (flowed∩PH); information that is forwarded (received∩sent); information received from a variety of sources (source1∪source2∪source3 . . . ), etc., but the disclosure is not limited thereto.

FIG. 5 illustrates a process 500 which illustrates operations (e.g., Boolean operations) to intersect, union, and subtract boundary sets. As illustrated in the Venn diagram of FIG. 5, the input 502 includes data entering an application; the output 504 includes data leaving an application; Input n Output 506 includes data the application forwards; Input—Output 508 includes data consumed but not forwarded by the application; and Output—Input 510 includes data the application creates.

With reference to FIG. 6, a logic chart 600 has been illustrated to set operations on one dimension. At the coarse level, data may be described by its "Business Entity" type(s), and a number of "Classifiers" applied to constraint which instances of those type(s) are included. For example, "Trade" data is in scope, but only those where the "Asset Class" was "Equities" or "Credit", and where the "Currency" was "USD".

The Business Entity or a particular Classifier is a "dimension", in that there are a range of valid values, and the NHDAM 406 may be configured to declare that certain values are acceptable, e.g., Asset class should be Equities or Credit.

According to exemplary embodiments, the NHDAM 406 may be configured to perform set operations on a dimension. For example, if the dimension is "Asset Class," and the NHDAM 406 receives Trades with Asset Class of Equities or Credit, and it transmits Equities and Rates, the NHDAM 406 is configured to perform a subtract operation to deduce that Credit information is being consumed and not forwarded (see e.g., element 508 as illustrated in FIG. 5). According to exemplary embodiments, the NHDAM 406 may be configured to intersect, union and subtract dimensions. After working out the possibilities, the NHDAM 406 may be configured to generate output that indicates cases where the valid values are those NOT in a set. For example, a single dimension might cover a hierarchy of values. For example, the NHDAM 406 may determine that if Europe contains UK, France and Germany, then Europe–UK=France and Germany.

With reference to FIG. 7, a process 700 has been illustrated to set operations on two dimensions. Windows desktop may display a number of overlapping windows (A, B). Each window may have two dimensions: one is the range of X coordinates it covers, and the other is the range of Y. As windows (A, B) are moved around, or applications repaint their content, the NHDAM 406 may be configured to calculate which parts of the screen to update. For example, if window A is partially obscured by window B, when repainting A, the NHDAM 406 repaints the screen defined by A-B. When presenting the desktop to other computing devices, if applications P, Q. and R have changed, it may be necessary to transmit P U Q U R to the other computing devices in a chat application.

As illustrated in FIG. 7, rectangle—rectangle can be a set of rectangles. Thus, the datatype being used by the NHDAM 406 as inputs to, and outputs of, the (intersection, union and subtraction) operations are sets of rectangles. According to exemplary embodiments, the NHDAM 406 may be configured to extend the process 700 as illustrated in FIG. 7 to N dimensions to automatically generate N-dimensional hypercubes. Exemplary N-dimensional hypercubes are illustrated in U.S. patent application Ser. No. 16/818,464 filed on Mar. 13, 2020, by the inventors of the instant application (Titled: METHOD AND APPARATUS FOR IMPLEMENTING AN N-DIMENSIONAL HYPERCUBE VISUALIZATION MODULE; the entire disclosure of which is hereby incorporated by reference).

According to exemplary embodiments, the NHDAM 406 may be configured to automatically generate a data structure to represent the entire data with properties, such as: Boundary Set has zero or more Scoping Expressions (i.e., hypercubes); a Scoping Expression has zero or more TermSets (i.e., constraints zero or more dimensions); a TermSet selects the valid (or invalid) values for a dimension from a taxonomy, etc.

According to exemplary embodiments, the NHDAM 406 may be configured to first, represent the data present or flowing as a set of N-dimensional hypercubes. One dimension would typically be the Data Concept, as might be found in a Conceptual Data Model (e.g., Trade, Payment, Account, etc.). Which other qualifying (also referred as Qualifier) dimensions apply would depend upon the Data Concept(s), and would subset the instances of the Data Concept. The set of all possible Data Concepts and all possible Qualifier values would be represented by Terms in (or not in) appropriate Taxonomies generated by the Taxonomy creation module 408.

Consider the following examples.

Example 1 (eg1): the data flowing from "Trade Capture" application embedded within the trade capture application system 308(1) to "Trade Settlement" application embedded within the trade settlement application system 308(3) is the "Trade" Data Concept where "Booking Currency" is in {"EUR", "JPY") and "Booking Location" is in {"Europe", "Asia/Japan" } or "Trade" Data Concept where "Booking Currency" is in {"USD" }. The first line is a statement about the flow of information. The next two lines each describes an N-dimensional hypercube, the first having 3 dimensions, the second having only 2 dimensions. The fact that this example corresponds to "Trades." makes "Booking Currency" and "Booking Location" valid Qualifier dimensions.

The "EUR", "JPY" and "USD" Terms are drawn from a "Currency" Gkissary (i.e., a controlled list of Terms). The "Europe", "Asia" and "Japan" are Terms drawn from a "Location" Taxonomy—"Asia/Japan" here is the notation for "the Japan part of Asia". In the example 1, a particular Trade, denominated in "JPY", booked in France, is included within the data described. Similarly, a particular Trade, denominated in "EUR", booked in the USA, is not included within the data described.

Thus, from example 1 (eg1) above, it should be apparent that each set of N-dimensional hypercubes is actually expressed as "sum of products form". For a point to be in an N-dimensional hypercube, it must satisfy the constraint on the first dimension. AND then next, AND the next . . . . Thus, the NHDAM 406 may be configured to express each set of N-dimensional hypercubes as sum-of-products form so that a data point to be included in an N-dimensional hypercube, the data point satisfies constraint on each dimension of the N-dimensional hypercube in successions. For a point to be in the set of N-dimension hypercubes, it can be in the first hypercube, OR the next, OR the next . . . . Thus, the NHDAM 406 may be configured to express each set of N-dimensional hypercubes as sum-of-products form so that a data point to be included in the set of N-dimensional hypercubes, the data point satisfies a constraint that the data point is included in at least one of the hypercube among the set of N-dimensional hypercubes.

Any subset of an N-dimensional space may be described by a set of N-dimensional hypercubes.

Example 2 (eg2): the data flowing into the "Trade Capture" application is nothing.

Example 3 (eg3); the "Trade Capture" application creates the "Trade" Data Concept where "Booking Currency" is in {"EUR", "JPY", "USD"} and "Booking Location" is in {"Europe", "Asia", "USA" }.

Thus, it should be the case that eg2+eg3 is >=eg1, or expressed in set notation eg1—(eg2 union eg3)=empty set. However, in the examples given above, this may not be the case because there are "USD" Trades for locations other than "Europe", "Asia" and "USA".

Thus, a question may remain as to why "Trade Capture" captures Trades for all of "Asia", and yet it only sends those pertaining to the "Japan" portion of "Asia" for settlement. A solution to the above problem may involve creating a datastructure by utilizing the NHDAM 406 to represent a set of N-dimensional hypercubes, referred to as "CubeSet". According to exemplary embodiments, operations may be implemented on the CubeSet type, so that the NHDAM 406 may calculate the union, intersection and difference between CubeSets, which each may produce a single CubeSet.

The operations may not be defined at the Cube level, as a Cube minus a Cube does not always produce a Cube. For example, one rectangle minus another rectangle could produce a rectangle, an L shaped result, a rectangle with a rectangular hole in it, or nothing (see, e.g., FIG. 5). The intersection, union and difference of CubeSets may produce CubeSet results with increasingly large numbers of Cubes. According to exemplary embodiments, the NHDAM 406 may be configured to apply an algorithm to merge Cubes, thereby reducing the number required, in order to keep storage space down and processing speed high.

In general, this may be an O(nCube!) problem (therefore intractable for large values of nCube), but a "local minimum" engineering compromise may achieve close to O(nCube^2).

According to exemplary embodiments, the values acceptable in each dimension may be expressed as a set of included or excluded terms from a taxonomy. Because the NHDAM 406 is configured to pick terms from a taxonomy, each included or excluded term may be further qualified with a set of included or excluded terms from the next level down. Thus, it becomes possible to concisely and efficiently represent values such as: Europe all of Europe; Europe/France the France part of Europe, i.e., France; Europe/France/Paris Paris; Europe/{France,Germany} France and Germany; Europe/-UK all of Europe, except the UK; Europe/-{UK, Italy} all of Europe, except the UK and Italy; -Asia all of the world, except Asia; -Asia/-China all of the world, except Asia, except China (i.e., adding China back in again); -{ } exclude nothing, i.e., everything.

In the above notation, reads "/" as "qualified by" and "-" as "excluding". The {set} notation may be unnecessary when the set has a single member, and therefore may be omitted, e.g., {Europe} is the same as Europe.

Again, operations may be implemented by the NHDAM 406 so that the intersection, union and difference of such values can be calculated, for example, as follows:

Europe intersect Europe/UK=>Europe/UK

Asia/{China,Japan} union Asia/{Japan, Malaysia}=>Asia/{China,Japan,Malaysia}

{Europe,Asia} subtract {Africa,Asia}=>Europe

Thus, being able to intersect, union and difference values in a single dimension may be a pre-requisite to being able to intersect, union and difference CubeSets.

Examples of expressing data quality checks in boundary set form may include: If an application receives inflows I1, I2, . . . In, then its aggregate inflow I, is the union of I1, I2, . . . In; If an application sends outflows O1, I2, . . . On, then its aggregate outflow O, is the union of O1, O2, . . . On; the application is behaving as a System of Record (SOR) for the data it sends, but does not receive, for example: O-I; it is behaving as an Authoritative Data Source (ADS) for the data it receives and sends, for example: I intersect O; it is a terminal node for I-O, for example: it receives it but does not send it.

Thus, according to exemplary embodiments, the NHDAM 406 may be configured to calculate that the SOR for the application is calcSOR. Someone responsible for the architecture of an application may declare that the application is supposed to be the SOR for declSOR. calcSOR-declSOR is the amount of original outflow which as not expected by the architect. declSOR-calcSOR is the amount of data the architect expects the application to be the creator of, which doesn't seem to be flowing anywhere. Both of these two amounts of data should be empty when the flows agree with the architect's declaration.

Indeed, if the flow information is known, calculated ADS and SOR information may be provided to the architect's computing device to seed the process of declaring.

According to exemplary embodiments, the NHDAM 406 may be configured to produce a data-structure and algorithm capable of describing a set of data as described herein by the above-disclosed processes, thereby significantly improving technical efficiencies of data processing devices in locating data and reducing risk by controlling and/or sourcing to a match to fitness for purpose. The application of disclosed N-dimensional hypercube datatype for Boundary Set analysis may provide a means to provide a scientific data-driven led architectural approach to aspects like application and database rationalization, strategic data sourcing, data sourcing catalogues and appropriate entitlement and data usage, etc., but the disclosure is not limited thereto.

In FIG. 8, the output, according to exemplary embodiments, describes three DQ rules that have been calculated by the NHDAM 406 (i.e., the hypercube library). Outflow Rule (for the whole Business Application)=Out-(In+Created); the result should be nothing. Individual Outflow Rule (for the scope of the Business Application defined by the Owner) =Out-(In+Created); the result should be less than zero. Gap To Authority=Data received by the Business Application which has not originated from a SOR or ADS. Authority Rule=Output-(SOR u ADS).

FIG. 9A-9B, illustrate a row for each Business Application representing the Venn Diagram shown in FIG. 5. Input Flows=All input from providing Business Applications; Input=All data input from providing Business Applications; Calculated Inventory=Data consumed by the Business Application which is not in the Output; Declared Inventory=The Inventory declared by the Business Application Owner; Calculated Minus Declared Inventory=What is missing from the Declared (i.e. received but not declared); Calculated Intersect Declared Inventory=What is common across both Calculated and Declared; Declared Minus Calculated=What is too much in the Declared (i.e. not received), and so on.

According to exemplary embodiments, a non-transitory computer readable medium may be configured to store instructions for applying the NHDAM 406 for automatically generating a data structure. According to exemplary embodiments, the instructions, when executed, may cause a processor embedded within the NHDAM 406 or the NHDAD 402 to perform the following: accessing a database that stores a plurality of data each associated with a corresponding application and each including metadata describing information about data present in an application, information about data that an application is authoritative, and information about data that flows between applications; creating taxonomies describing data concepts associated with the metadata and storing the taxonomies onto the database; receiving the metadata and the taxonomies from the database via a communication network; automatically generating a cube set including a set of N-dimensional hypercubes from the received metadata to represent the metadata describing the information about the data present in the application, the information about the data that the application is authoritative, and the information about the data that flows between applications; automatically generating a map from the cube set to express data quality checks and rules that apply to nodes in the map; and applying the data quality checks and rules to the received metadata to automatically generate a data structure. The processor may be the same or similar to the processor 104 as illustrated in FIG. 1 or the processor embedded within NHDAD 202, NHDAD 302, NHDAD 402, and NHDAM 406.

Figure 10:
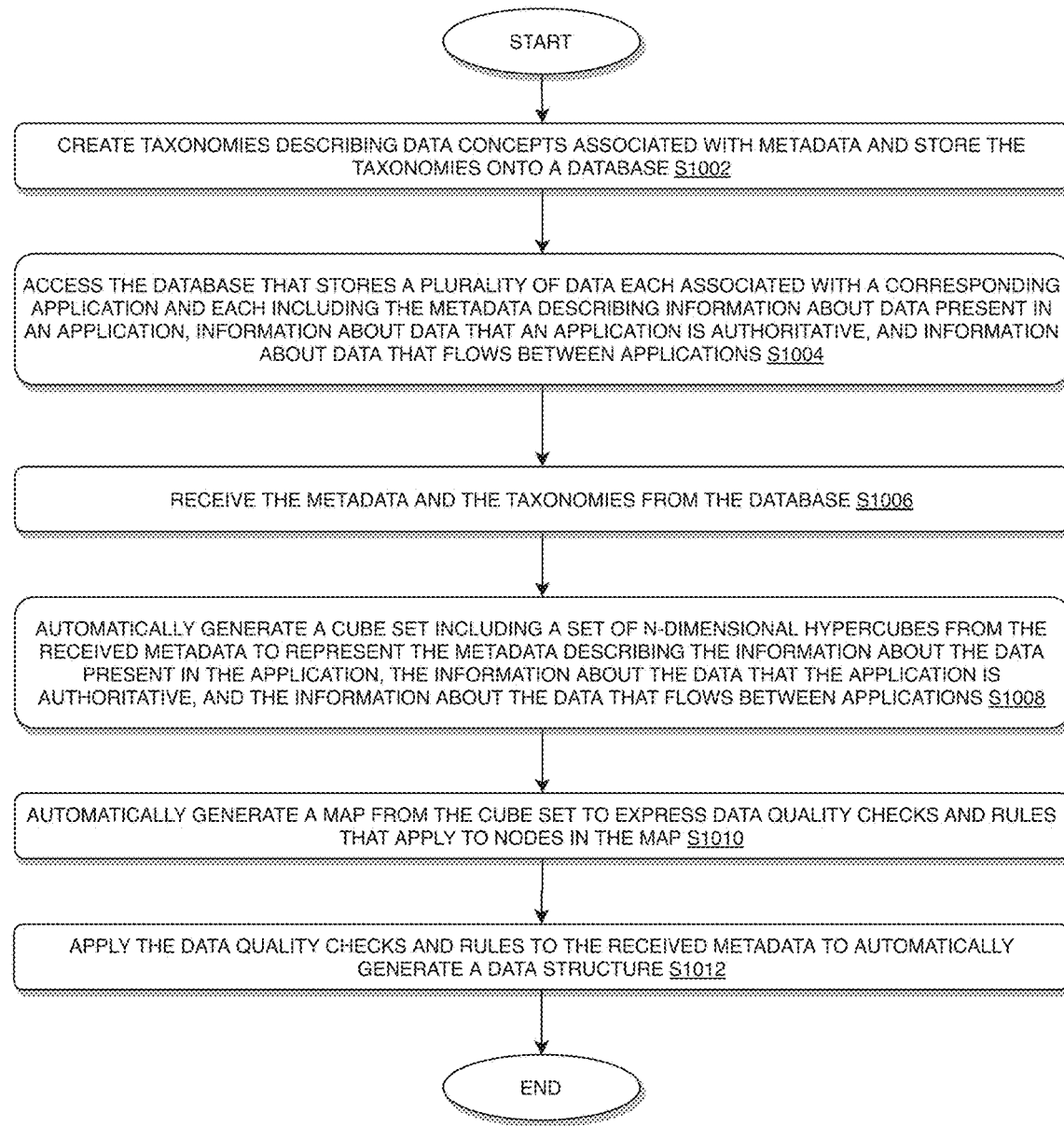
FIG. 10 illustrates a flow chart for implementing an N-dimensional hypercube datatype application module in accordance with an exemplary embodiment.

FIG. 10 illustrates a flow chart for applying an N-dimensional hypercube datatype application module for automatically generating data structure by utilizing one or more processors and one or more memories in accordance with an exemplary embodiment.

In the process 1000 of FIG. 10, at step S1002, taxonomies describing data concepts associated with metadata may be created and stored the taxonomies onto a database. At step S1004, a database may be provided that stores a plurality of data each associated with a corresponding application and each including the metadata describing information about data present in an application, information about data that an application is authoritative, and information about data that flows between applications. At step S1006, the metadata and the taxonomies may be received from the database via a communication network. At step S1008, a cube set including a set of N-dimensional hypercubes may be automatically generated from the received metadata to represent the metadata describing the information about the data present in the application, the information about the data that the application is authoritative, and the information about the data that flows between applications. At step S1010, a map from the cube set may be automatically generated to express data quality checks and rules that apply to nodes in the map. At step S1012, the data quality checks and rules may be applied to the received metadata to automatically generate a data structure.

According to exemplary embodiments, the process 1000 may further include: automatically generating a cube set comprises automatically creating a data-structure from the received metadata to represent the set of N-dimensional hypercubes.

According to exemplary embodiments, the process 1000 may further include: applying intersection, union, and difference operations between cube sets to generate a single cube set.

According to exemplary embodiments, the process 1000 may further include: describing any subset of an N-dimensional space by a predefined number of sets of N-dimensional hypercubes selected from the set of N-dimensional hypercubes, but the disclosure is not limited thereto. For example, according to exemplary embodiments, the process 1000 may further include segmenting any cube into smaller cubes, and applying a subset of those smaller cubes.

According to exemplary embodiments as disclosed above in FIGS. 1-10, technical improvements effected by the instant disclosure may include platforms for application of an N-dimensional hypercube datatype and code module for automatically generating a data structure and applying the data structure to model data in various locations (nodes) and data flowing between those locations to support calculation and reasoning about data present in locations (nodes) and data flowing between them, including checking data quality and automatically generating lineage diagrams, thereby gaining a high degree of confidence in the metadata recorded, but the disclosure is not limited thereto. In addition, according to exemplary embodiments as disclosed above in FIGS. 1-10, technical improvements effected by the instant disclosure may include platforms for implementing an N-dimensional hypercube datatype application module that may be configured to produce a data-structure and algorithm capable of describing a set of data as described herein by the above-disclosed processes, thereby significantly improving technical efficiencies of data processing devices in locating data and reducing risk by controlling and/or sourcing to a match to fitness for purpose, but the disclosure is not limited thereto. Further, according to the context of the exemplary embodiments of the instant disclosure disclosed above with respect to FIGS. 1-10, automatically detecting and resolving data quality issues significantly reduces size of data for analysis and storage, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for application of an N-dimensional hypercube datatype for automatically generating a data structure by utilizing one or more processors and one or more memories, the method comprising:

creating taxonomies describing data concepts associated with metadata and storing the taxonomies onto a database;

accessing the database, wherein the database stores a plurality of data each associated with a corresponding application and each including the metadata, and wherein the metadata describes information about data present in an application, information about data that an application is authoritative, and information about data that flows between applications;

receiving the metadata and the taxonomies describing the data concepts from the database;

automatically generating a cube set including a set of N-dimensional hypercubes from the received metadata to represent the metadata describing the information about the data present in the application, the information about the data identifying that the application is authoritative, and the information about the data that flows between applications, wherein the set of N-dimensional hypercubes forms a data model for generating a data structure;

automatically generating a lineage map from the cube set to express data quality checks and rules that apply to nodes in the lineage map;

automatically checking whether a node in the lineage map is acting as a system of record (SOR) or as an authoritative data source (ADS) for the same set of data, wherein:

when the node creates data, that node is referred to as the SOR for that data, when the node does not receive data, but sends the data that it creates to another node of the lineage map for further processing, then recording that the node is acting as the SOR for that data, when a node receives data and sends the data to another node of the lineage map for further processing, then recording that the node is acting as the ADS for that data, and the lineage map includes metadata corresponding to one or more of the following metadata: calculated SOR, calculated ADS, declared SOR, declared ADS, calculated SOR minus declared SOR, calculated ADS minus declared ADS, declared SOR minus calculated SOR, declared ADS minus calculated ADS, and overlap of ADS and SOR;

applying the data quality checks and the rules to the received metadata to automatically generate the data structure from the received metadata to represent the set of N-dimensional hypercubes as the data model;
applying the data structure to model data in various nodes of the data model and data flowing between those nodes to support calculation and reasoning about data present in the nodes and data flowing between them;
automatically detecting, based on the lineage map, that data leaving the application is not more than data entering the application including any data created by the application, thereby improving accuracy in the metadata recorded; and
automatically detecting and resolving data quality issues based on the lineage map thereby reducing size of data for analysis and storage.

2. The method according to claim 1, further comprising: applying intersection, union, and difference operations between cube sets to generate a single cube set.

3. The method according to claim 1, wherein values acceptable in each dimension of the N-dimensional hypercubes are expressed as a set of included or excluded terms from a taxonomy among the created taxonomies describing the data concepts.

4. The method according to claim 1, wherein each set of N-dimensional hypercubes is expressed as sum-of-products form so that a data point is-included in the set of N-dimensional hypercubes, the data point satisfies a constraint on each dimension of the N-dimensional hypercube in successions.

5. The method according to claim 1, wherein each set of N-dimensional hypercubes is expressed as sum-of-products form so that a data point is included in the set of N-dimensional hypercubes, the data point satisfies a constraint that the data point is included in at least one hypercube among the set of N-dimensional hypercubes.

6. The method according to claim 1, further comprising: describing any subset of an N-dimensional space by a predefined number of sets of N-dimensional hypercubes selected from the set of N-dimensional hypercubes.

7. A system for application of an N-dimensional hypercube datatype for automatically generating a data structure, the system comprising:
a database that stores a plurality of data each associated with a corresponding application and each including metadata, wherein the metadata describes information about data present in an application, information about data that an application is authoritative, and information about data that flows between applications; and
a processor coupled to the database via a communication network, wherein the processor is configured to:
create taxonomies describing data concepts associated with the metadata and store the taxonomies onto the database;
receive the metadata and the taxonomies describing the data concepts from the database via a communication network;
automatically generate a cube set including a set of N-dimensional hypercubes from the received metadata to represent the metadata describing the information about the data present in the application, the information about the data identifying that the application is authoritative, and the information about the data that flows between applications, wherein the set of N-dimensional hypercubes forms a data model for generating a data structure;
automatically generate a lineage map from the cube set to express data quality checks and rules that apply to nodes in the lineage map;
automatically check whether a node in the lineage map is acting as a system of record (SOR) or as an authoritative data source (ADS) for the same set of data, wherein:
when the node creates data, that node is referred to as the SOR for that data,
when the node does not receive data, but sends the data that it creates to another node of the lineage map for further processing, then recording that the node is acting as the SOR for that data,
when a node receives data and sends the data to another node of the lineage map for further processing, then recording that the node is acting as the ADS for that data, and
the lineage map includes metadata corresponding to one or more of the following metadata: calculated SOR, calculated ADS, declared SOR, declared ADS, calculated SOR minus declared SOR, calculated ADS minus declared ADS, declared SOR minus calculated SOR, declared ADS minus calculated ADS, and overlap of ADS and SOR;
apply the data quality checks and the rules to the received metadata to automatically generate the data structure from the received metadata to represent the set of N-dimensional hypercubes as the data model;
apply the data structure to model data in various nodes of the data model and data flowing between those nodes to support calculation and reasoning about data present in the nodes and data flowing between them;
automatically detect, based on the lineage map, that data leaving the application is not more than data entering the application including any data created by the application, thereby improving accuracy in the metadata recorded; and
automatically detect and resolve data quality issues based on the lineage map thereby reducing size of data for analysis and storage.

8. The system according to claim 7, wherein the processor is further configured to apply intersection, union, and difference operations between cube sets to generate a single cube set.

9. The system according to claim 7, wherein values acceptable in each dimension of the N-dimensional hypercubes are expressed as a set of included or excluded terms from a taxonomy among the created taxonomies describing the data concepts.

10. The system according to claim 7, wherein each set of N-dimensional hypercubes is expressed as sum-of-products form so that a data point is included in the set of N-dimensional hypercubes, the data point satisfies a constraint on each dimension of the N-dimensional hypercube in successions.

11. The system according to claim 7, wherein each set of N-dimensional hypercubes is expressed as sum-of-products form so that a data point is included in the set of N-dimensional hypercubes, the data point satisfies a constraint that the data point is included in at least one hypercube among the set of N-dimensional hypercubes.

12. The system according to claim 7, wherein the processor is further configured to describe any subset of an N-dimensional space by a predefined number of sets of N-dimensional hypercubes selected from the set of N-dimensional hypercubes.

13. A non-transitory computer readable medium configured to store instructions for applying an N-dimensional hypercube datatype for automatically generating a data structure, wherein, when executed, the instructions cause a processor to perform the following:

creating taxonomies describing data concepts associated with metadata and storing the taxonomies onto a database;

accessing the database, wherein the database stores a plurality of data each associated with a corresponding application and each including the metadata, and wherein the metadata describes information about data present in an application, information about data that an application is authoritative, and information about data that flows between applications;

receiving the metadata and the taxonomies describing the data concepts from the database;

automatically generating a cube set including a set of N-dimensional hypercubes from the received metadata to represent the metadata describing the information about the data present in the application, the information about the data identifying that the application is authoritative, and the information about the data that flows between applications, wherein the set of N-dimensional hypercubes forms a data model for generating a data structure;

automatically generating a lineage map from the cube set to express data quality checks and rules that apply to nodes in the lineage map; and automatically checking whether a node in the lineage map is acting as a system of record (SOR) or as an authoritative data source (ADS) for the same set of data, wherein:

when the node creates data, that node is referred to as the SOR for that data, when the node does not receive data, but sends the data that it creates to another node of the lineage map for further processing, then recording that the node is acting as the SOR for that data, when a node receives data and sends the data to another node of the lineage map for further processing, then recording that the node is acting as the ADS for that data, and the lineage map includes metadata corresponding to one or more of the following metadata: calculated SOR, calculated ADS, declared SOR, declared ADS, calculated SOR minus declared SOR, calculated ADS minus declared ADS, declared SOR minus calculated SOR, declared ADS minus calculated ADS, and overlap of ADS and SOR;

applying the data quality checks and the rules to the received metadata to automatically generate the data structure from the received metadata to represent the set of N-dimensional hypercubes as the data model;

applying the data structure to model data in various nodes of the data model and data flowing between those nodes to support calculation and reasoning about data present in the nodes and data flowing between them; and automatically detecting, based on the lineage map, that data leaving the application is not more than data entering the application including any data created by the application, thereby improving accuracy in the metadata recorded; and automatically detecting and resolving data quality issues based on the lineage map thereby reducing size of data for analysis and storage.

14. The non-transitory computer readable medium according to claim 13, wherein the instructions, when executed, further cause the processor to apply intersection, union, and difference operations between cube sets to generate a single cube set.

15. The non-transitory computer readable medium according to claim 13, wherein values acceptable in each dimension of the N-dimensional hypercubes are expressed as a set of included or excluded terms from a taxonomy among the created taxonomies describing the data concepts.

16. The non-transitory computer readable medium according to claim 13, wherein each set of N-dimensional hypercubes is expressed as sum-of-products form so that a data point is included in the set of N-dimensional hypercubes, the data point satisfies a constraint on each dimension of the N-dimensional hypercube in successions.

17. The non-transitory computer readable medium according to claim 13, wherein each set of N-dimensional hypercubes is expressed as sum-of-products form so that a data point is included in the set of N-dimensional hypercubes, the data point satisfies a constraint that the data point is included in at least one hypercube among the set of N-dimensional hypercubes.

* * * * *